(12) United States Patent  
Goto

(10) Patent No.: US 6,444,351 B1
(45) Date of Patent: Sep. 3, 2002

(54) SOLID ELECTROLYTE BATTERY

(75) Inventor: Shuji Goto, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/520,985

(22) Filed: Mar. 8, 2000

(30) Foreign Application Priority Data

Mar. 12, 1999 (JP) .......................................... 11-067031

(51) Int. Cl.[7] ................................................ H01M 4/00
(52) U.S. Cl. .......................... 429/94; 429/94; 429/211; 429/300; 429/304; 429/178; 429/181
(58) Field of Search .......................... 429/94, 211, 300, 429/304, 178, 181

(56) References Cited

U.S. PATENT DOCUMENTS 6,277,515 B1 * 8/2001 Akahira ....................... 429/152
6,277,516 B1 * 8/2001 Sasaki et al. ................ 429/162

* cited by examiner

Primary Examiner—Laura Weiner
(74) Attorney, Agent, or Firm—Sonnenschein, Nath & Rosenthal

(57) ABSTRACT

A solid-electrolyte battery incorporating an elongated electrode; a positive-electrode lead connected to the positive electrode such that its long side is substantially in parallel with the widthwise direction of the positive electrode and formed into a rectangle-like shape; an elongated negative electrode disposed opposite to the positive electrode; a negative-electrode lead connected to the negative electrode such that its long side is substantially in parallel with the widthwise direction of the negative electrode and formed into a rectangle-like shape; and a solid electrolyte layer formed on at least either surface of the positive electrode and the negative electrode, wherein the positive electrode and the negative electrode are laminated such that the surfaces on each of which the solid electrolyte layer is formed are disposed opposite to each other and wound in the lengthwise direction so as to be accommodated in a case of the solid-electrolyte battery, and a short side of at least either of the positive-electrode lead or the negative-electrode lead which is connected to the positive electrode or the negative electrode such that the short side is disposed opposite to the lengthwise end of the positive electrode or the negative electrode is shifted inwards as compared with the lengthwise end of the positive electrode or the negative electrode.

14 Claims, 6 Drawing Sheets

SOLID ELECTROLYTE BATTERY

RELATED APPLICATION DATA

The present application claims priority to Japanese Application No. P11-067031 filed Mar. 12, 1999 which application is incorporated herein by reference to the extent permitted by law.

BACKGROUND OF THE INVENTION

Field of the Invention

The present invention relates to a solid electrolyte battery incorporating a wound electrode constituted such that elongated positive and negative electrodes are laminated such that a solid electrolyte is sandwiched is wound in their lengthwise direction.

In recent years, a multiplicity of portable electronic apparatuses, such as camcorders, portable telephones and portable computers, are coming. An attempt has been made to reduce the size and weight of the apparatus. Also reduction in the size and weight of a battery serving as the portable power source of the electronic apparatus is required. Therefore, a lithium ion battery capable of meeting the requirement has been developed and industrially put into practical use. The foregoing battery incorporates a porous polymer separator disposed between the positive electrode and the negative electrode and impregnated with electrolytic solution. To prevent leakage of the electrolytic solution, the overall body of the battery is packaged in a thick and heavy metal container.

On the other hand, a solid-electrolyte battery incorporating a solid electrolyte which serves as the ion conductive material acting between the positive electrode and the negative electrode is free of leakage of solution. Therefore, the solid electrolyte battery is considered to be capable of reducing the size and weight of the battery by simplifying the package. In particular, attention is focused on a solid polymer electrolyte containing lithium salt which is dissolved in polymers as solid solution and a solid electrolyte in the form of gel (hereinafter called a "gel electrolyte") such that matrix polymers contain electrolytes.

A gel electrolyte battery 10 incorporating the gel electrolyte, for example, as shown in FIG. 1, has a wound electrode hermetically enclosed in a casing film 11. The wound electrode incorporates an elongated positive electrode 12, an elongated negative electrode 13 disposed opposite to the negative electrode 13 and a gel electrolyte layer 14 disposed between the positive electrode 12 and the negative electrode 13. The positive electrode 12 and the negative electrode 13 are laminated such that the gel electrolyte layer 14 is sandwiched between the positive electrode 12 and the negative electrode 13. The formed laminate is wound many times in the lengthwise direction so that the wound electrode is constituted. A positive-electrode lead (not shown) is connected to the positive electrode 12, while a negative-electrode lead 15 is connected to the negative electrode 13.

The gel electrolyte battery 10 can be manufactured as follows.

The positive electrode 12 is manufactured as follows: a positive electrode mix containing a positive-electrode active material and a binder is uniformly applied to the two sides of a collector of the positive electrode. Then, the positive-electrode mix is dried so that a positive-electrode active material layer is formed. Then, drying is performed, and then a pressing process using a roll press is performed to obtain a positive-electrode sheet.

The negative electrode 13 is manufactured as follows: a negative electrode mix containing a negative-electrode active material and a binder is uniformly applied to the two sides of a collector of the negative electrode. Then, the negative-electrode mix is dried so that a negative-electrode active material layer is formed. Then, drying is performed, and then a pressing process using a roll press is performed to obtain a negative-electrode sheet.

The gel electrolyte layer 14 is formed as follows: sol electrolytic solution containing nonaqueous solvent, an electrolyte and matrix polymers is uniformly applied to the two sides of each of the positive-electrode sheet and the negative-electrode sheet, and then the two sheets are dried to remove the solvent. Thus, the gel electrolyte layer 14 is formed on the positive-electrode active material layer and the negative-electrode active material layer.

Then, the positive-electrode sheet having the gel electrolyte layer 14 formed thereon is cut into, for example, an elongated shape. Then, the gel electrolyte layer 14 and the positive-electrode active material layer in the portion in which the positive-electrode lead is welded is removed by cutting. The positive-electrode lead is welded to the cut portion so that the elongated positive electrode 12 having the gel electrolyte layer is obtained.

The negative-electrode sheet having the gel electrolyte layer formed thereon is cut into, for example, an elongated sheet. Then, the gel electrolyte layer and the negative-electrode active material layer in the portion in which the negative-electrode lead is welded is removed by cutting. The negative-electrode lead 15 is welded to the cut portion so that the elongated negative electrode 13 having the gel electrolyte layer is obtained.

Finally, the positive electrode 12 having the gel electrolyte layer 14 formed thereon and the negative electrode 13 having the gel electrolyte layer are laminated. The formed laminate is wound many times in the lengthwise direction so that the wound electrode is obtained. The wound electrode is sandwiched between the casing films 11, and then the outermost peripheries of the casing films 11 are welded to each other with heat to seal the opened portions. Thus, the wound electrode is hermetically enclosed in the casing films 11 so that the gel electrolyte battery 10 is manufactured.

The gel electrolyte battery 10 incorporating the thus-manufactured wound electrode suffers from a problem of defective sealing when the wound electrode is hermetically enclosed in the casing films 11.

The electrode leads disposed to overlap the elongated positive electrode 12 and the elongated negative electrode 13 in the widthwise direction of the electrodes 12 and 13 are welded for the overall width of the electrodes in order to reduce the internal resistance of the battery and improve the heavy load resistance.

The operation for sealing the opened portion of the casing films 11 is performed such that the space between the wound electrode and the casing films 11 is minimized to raise the volume energy density. At this time, an end of the electrode lead is sometimes caught by the sealed portion of the casing films 11, as indicated with a circle B shown in FIG. 1. FIG. 1 shows a state in which an end of the negative-electrode lead 15 has been caught by the sealed portion of the casing films 11.

If the end of the electrode lead is caught by the sealed portion of the casing films 11, the portion cannot satisfactorily be sealed. The defective sealing and a damaged portion of the casing film caused when the electrode lead has been caught result in introduction of moisture into the space between the casing films 11. Thus, an adverse influence is exerted on the performance of the gel electrolyte battery 10.

SUMMARY OF THE INVENTION

In view of the foregoing, an object of the present invention is to provide a solid-electrolyte battery which is capable of preventing a problem that an electrode lead is caught by casing films when the casing films are sealed without any deterioration in the heavy load resistance and preventing defective sealing.

To achieve the foregoing object, according to one aspect of the present invention, there is provided a solid-electrolyte battery comprising: an elongated electrode; a positive-electrode lead connected to the positive electrode such that the long side of the positive-electrode lead is substantially in parallel with the widthwise direct ion of the positive electrode and formed into substantially a rectangular shape; an elongated negative electrode disposed opposite to the positive electrode; a negative-electrode lead connected to the negative electrode such that the long side of the negative-electrode lead is substantially in parallel with the widthwise direction of the negative electrode and formed into substantially a rectangular shape; and a solid electrolyte layer formed on at least either surface of the positive electrode and the negative electrode, wherein the positive electrode and the negative electrode are laminated such that the surfaces on each of which the solid electrolyte layer is formed are disposed opposite to each other and wound in the lengthwise direction so as to be accommodated in a case of the solid-electrolyte battery, and a short side of at least either of the positive-electrode lead or the negative-electrode lead which is connected to the positive electrode or the negative electrode such that the short side is disposed opposite to the lengthwise end of the positive electrode or the negative electrode is shifted inwards as compared with the lengthwise end of the positive electrode or the negative electrode.

The solid-electrolyte battery according to the present invention has the structure that the short side of at least either of the positive-electrode lead or the negative-electrode lead which is connected to the positive electrode or the negative electrode such that the short side is disposed opposite to the lengthwise end of the positive electrode or the negative electrode is shifted inwards as compared with the lengthwise end of the positive electrode or the negative electrode. Therefore, the positive-electrode lead or the negative-electrode lead is not caught by the sealed portion of the case of the solid-electrolyte battery when the wound positive electrode and negative electrode are accommodated in the case of the solid-electrolyte battery.

Other objects, features and advantages of the invention will be evident from the following detailed description of the preferred embodiments described in conjunction with the attached drawings.

DETAILED DESCRIPTION OF THE PREFERRED EMBODIMENTS

An embodiment of the present invention will now be described.

Figure 1:
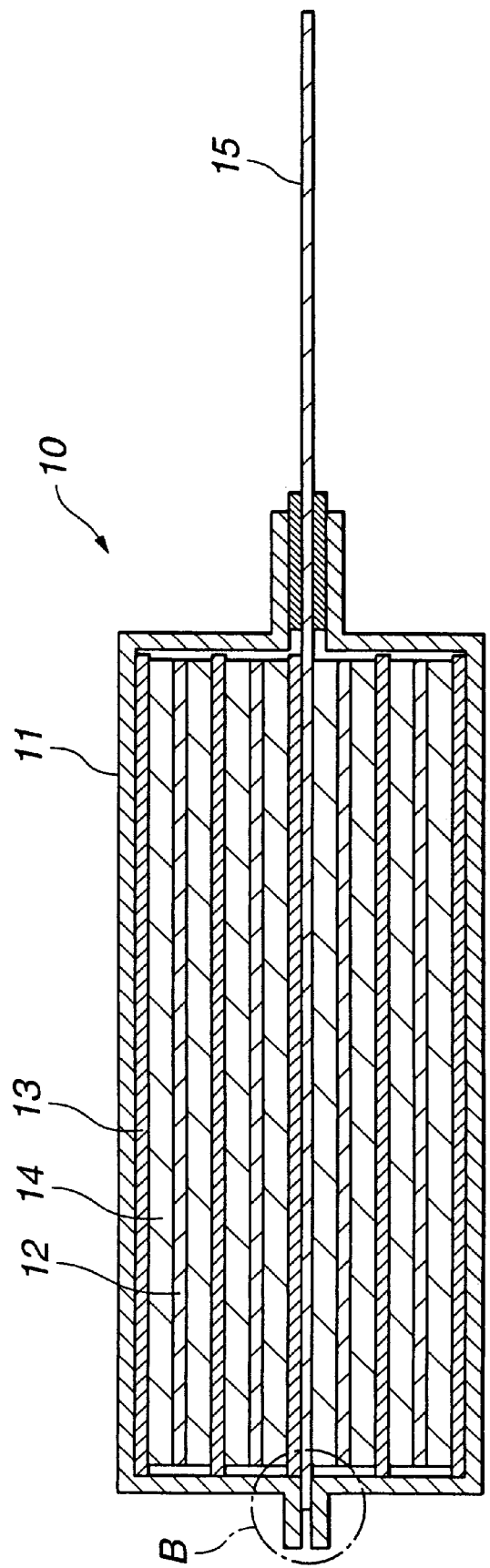
FIG. 1 is a cross sectional view showing an example of the structure of a conventional solid-electrolyte battery.
Figure 2:
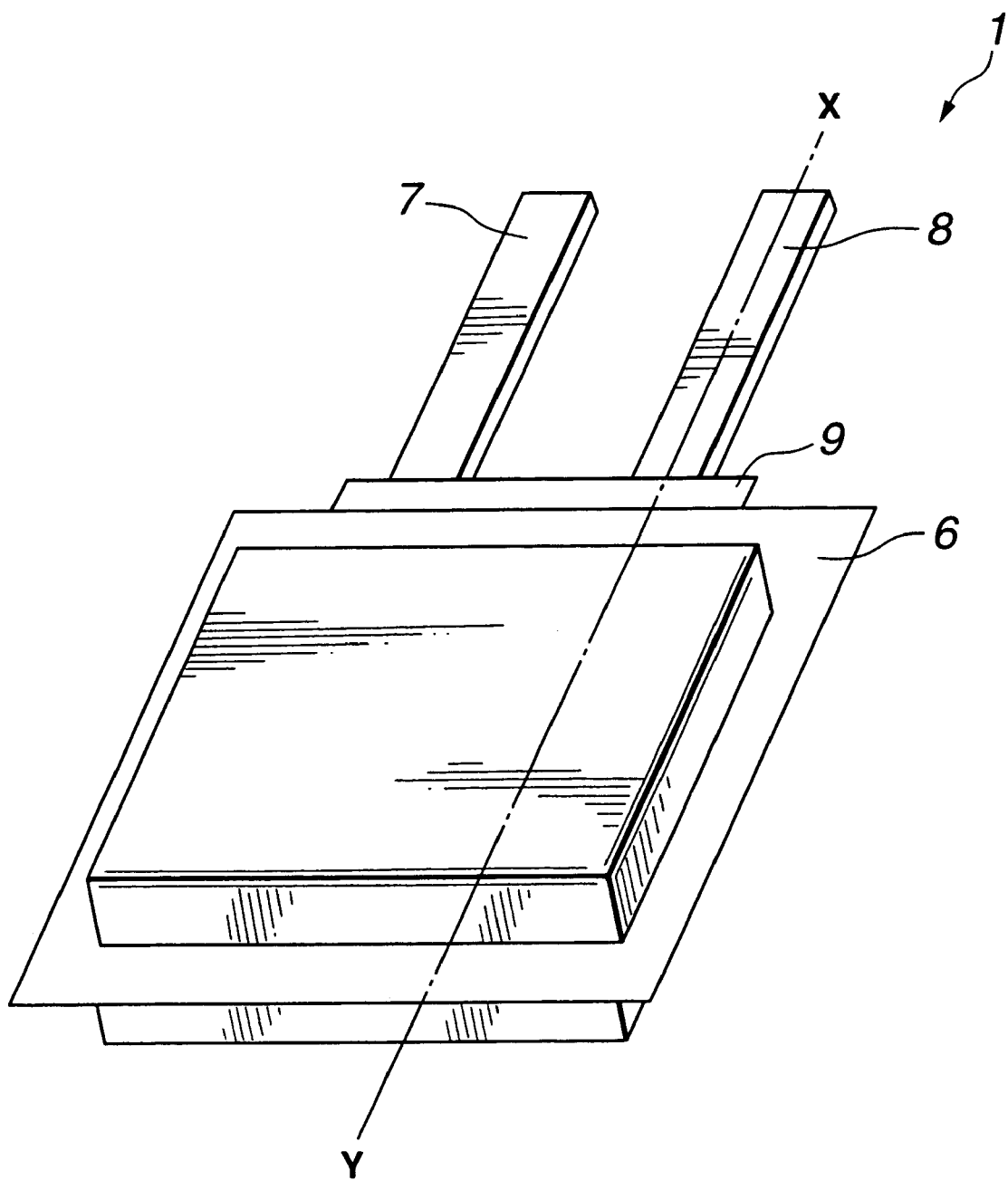
FIG. 2 is a perspective view showing an example of the structure of a solid-electrolyte battery according to the present invention.
Figure 3:
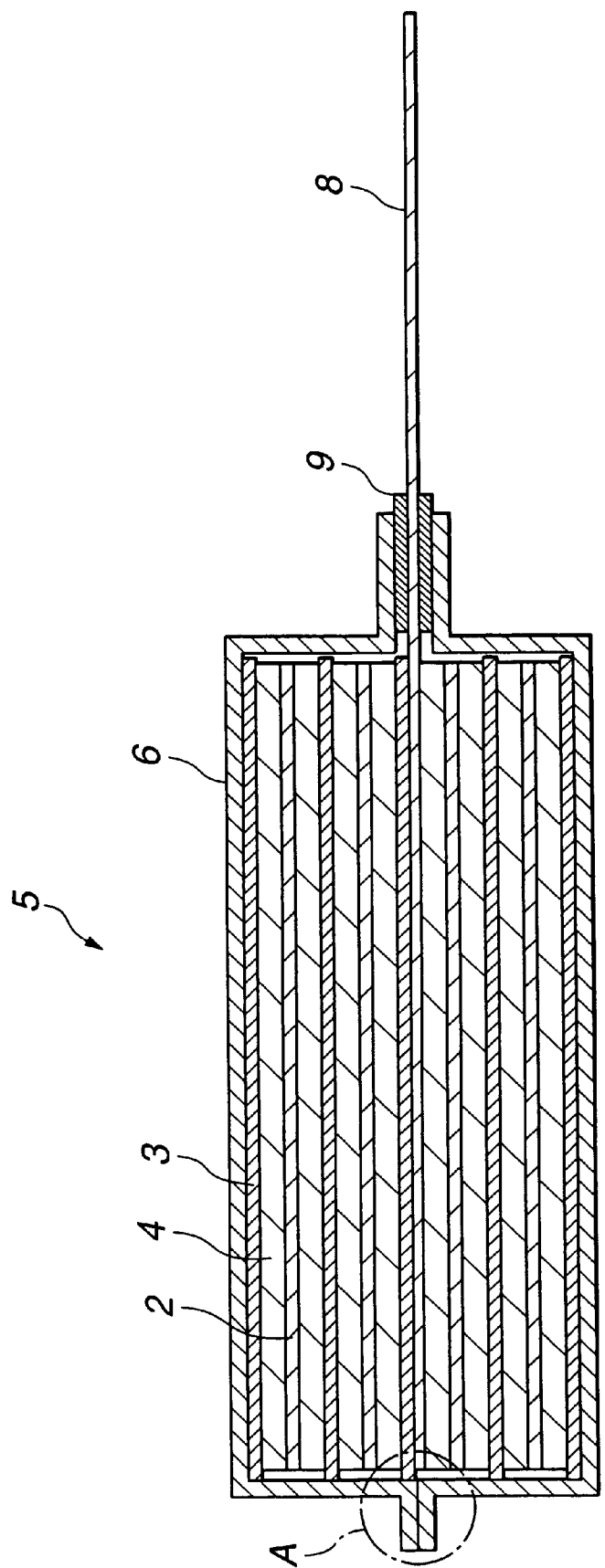
FIG. 3 is a cross sectional view taken along line X-Y shown in FIG. 2.
Figure 4:
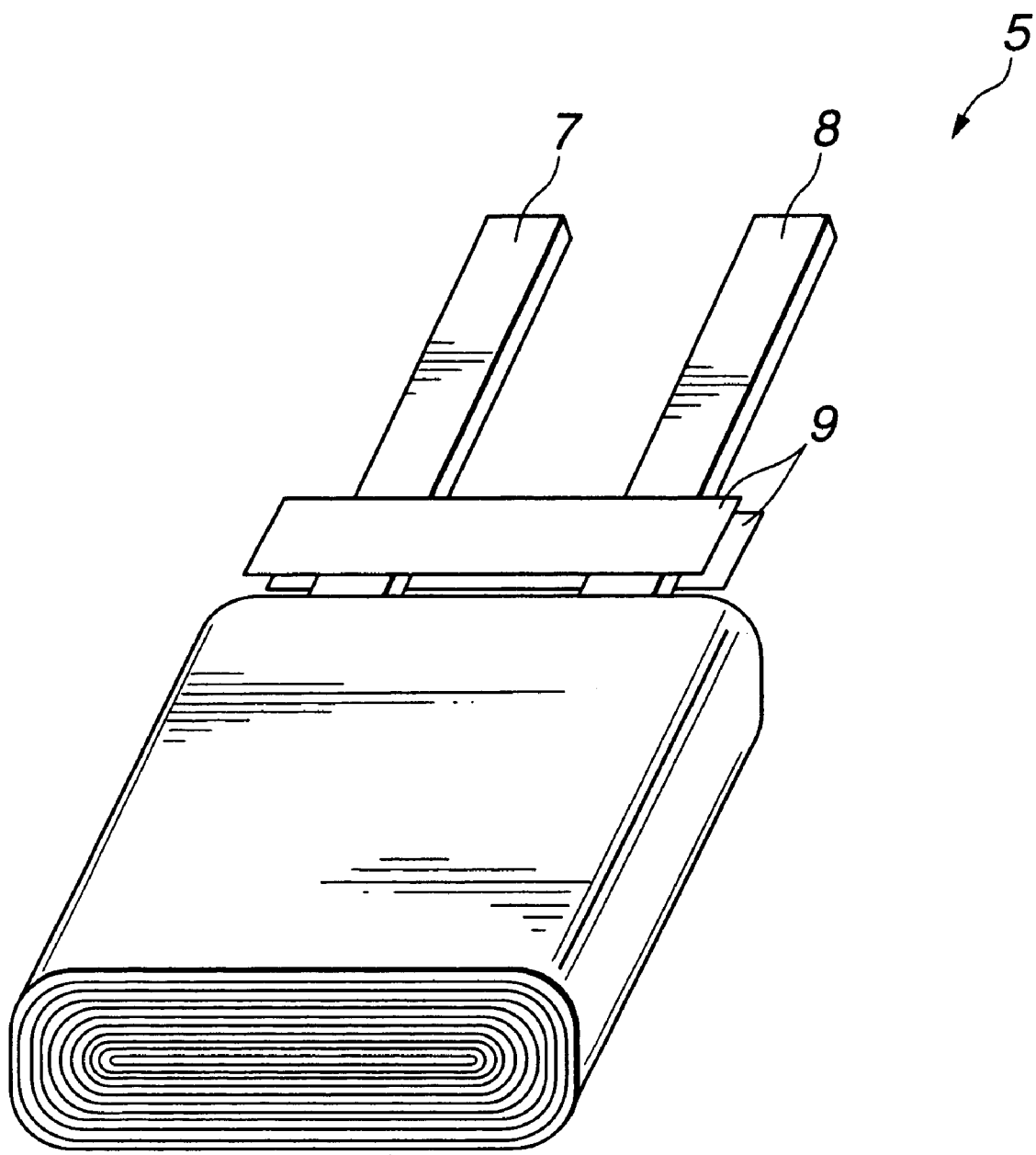
FIG. 4 is a perspective view showing a state where a positive electrode and a negative electrode have been formed into a wound electrode.

FIGS. 2 to 4 show an example of the structure of a gel electrolyte battery according to this embodiment. The gel electrolyte battery 1 incorporates a laminated electrode 5 shown in FIGS. 3 and 4 and covered with a casing film 6 made of insulating material and thus hermetically enclosed in the casing film 6. As shown in FIGS. 3 and 4, the laminated electrode 5 incorporates a positive electrode 2, a negative electrode 3 disposed opposite to the positive electrode 2 and a gel electrolyte layer 4 disposed between the positive electrode 2 and the negative electrode 3. The laminated electrode 5 has the structure that the positive electrode 2 and the negative electrode 3 are laminated such that the gel electrolyte layer 4 is sandwiched between the positive electrode 2 and the negative electrode 3. As shown in FIG. 4, a positive-electrode lead 7 is connected to the positive electrode 2, while a negative-electrode lead 8 is connected to the negative electrode 3. As shown in FIGS. 2 and 3, the positive-electrode lead 7 and the negative-electrode lead 8 are sandwiched by the sealing portion which is the periphery of the casing film 6. Moreover, a resin film 9 is disposed in each of the portions in which the positive-electrode lead 7 and the negative-electrode lead 8 are brought into contact with the casing film 6.

Figure 5:
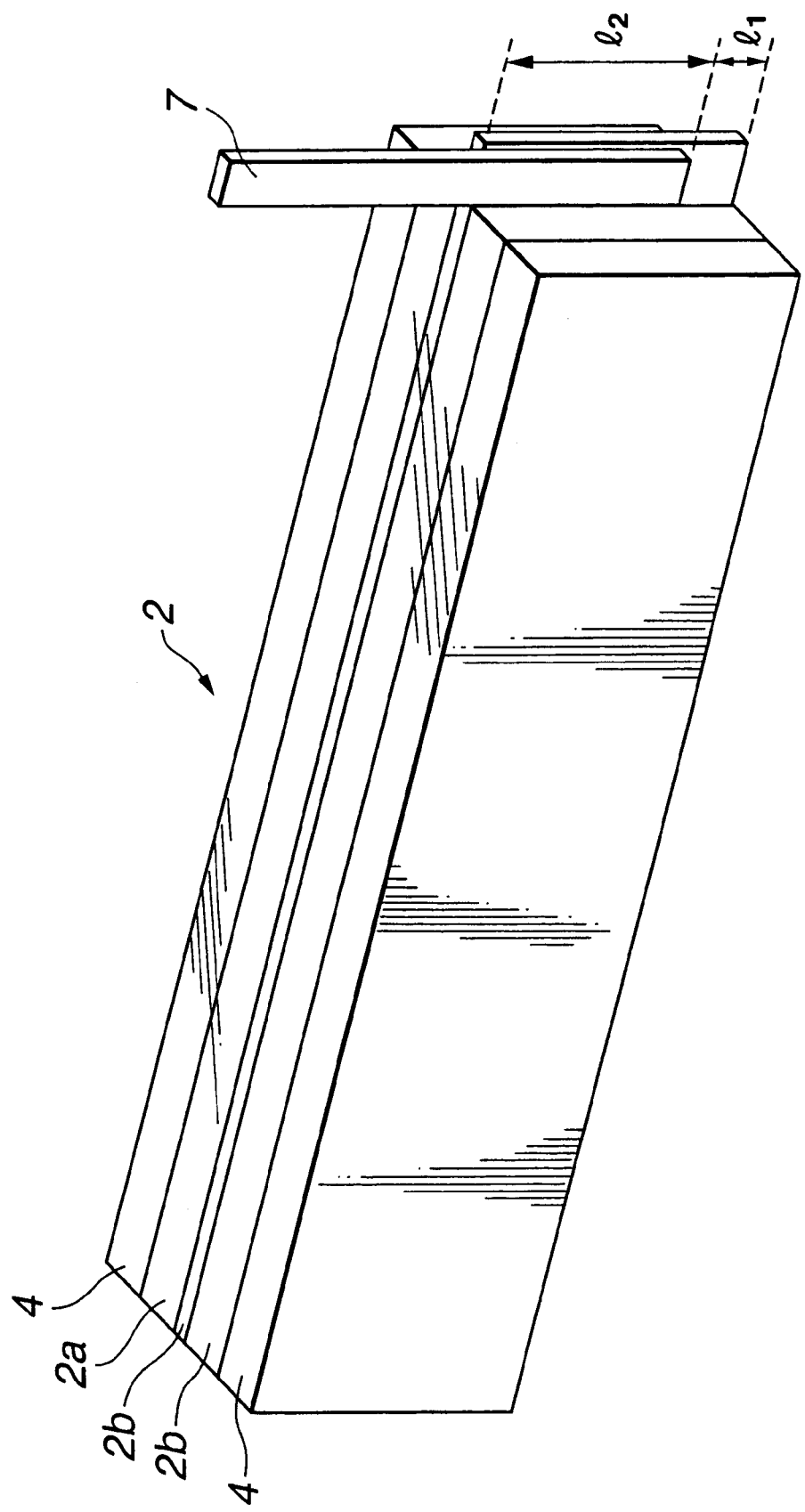
FIG. 5 is a perspective view showing an example of the structure of the positive electrode.

As shown in FIG. 5, the positive electrode 2 has a positive-electrode active material layer 2a containing positive-electrode active material and formed on each of the two sides of the collector 2b of the positive electrode 2. The collector 2b of the positive electrode 2 is constituted by metal foil, such as aluminum foil. FIG. 5 shows a state in which the gel electrolyte layer 4 has been formed on the positive-electrode active material layer 2a.

The positive-electrode active material may be lithium cobalt acid, lithium nickel acid, lithium manganese acid, material obtained by substituting other transition metal for a portion of each of the composite oxides, a transition metal compound, such as manganese dioxide or vanadium pentoxide, or a calcogen compound of transition metal, such as iron sulfide.

The positive-electrode lead 7 is formed into substantially a rectangular shape. The positive-electrode lead 7 is welded to a lengthwise end of the collector 2b of the positive electrode 2 at which the gel electrolyte layer 4 and the positive-electrode active material layer 2a are not formed. The positive-electrode lead 7 is welded such that its long side is substantially in parallel with the widthwise direction of the collector 2b of the positive electrode 2. The positive-electrode lead 7 is constituted by, for example, aluminum foil.

As shown in FIG. 5, the gel electrolyte battery 1 incorporates the positive-electrode lead 7 welded thereto. The positive-electrode lead 7 is welded such that either of its short sides is inwards shifted for a predetermined length $l_1$ from either of the lengthwise end of the collector 2b of the positive electrode 2.

The positive-electrode lead 7 is inwards shifted from the lengthwise end of the collector 2b of the positive electrode 2 as described above. Thus, the positive-electrode lead 7 is not caught by the sealed portion of the casing film 6 when the wound electrode 5 is hermetically enclosed in the casing film 6. As a result, defective sealing caused from catch of the positive-electrode lead 7 by the sealed portion can considerably be prevented.

It is preferable that the amount $l_1$ of shift of the positive-electrode lead 7 from the end of the collector 2b of the positive electrode 2 is 0.5 mm or longer to realize satisfactory productivity. If the amount $l_1$ of shift is too large, the length (weld length) $l_2$ for which the positive-electrode lead 7 overlaps the collector 2b of the positive electrode 2 is shortened. Hence it follows that the area of contact between the positive-electrode lead 7 and the collector 2b of the positive electrode 2 is reduced. If the area of contact between the positive-electrode lead 7 and the collector 2b of the positive electrode 2 is reduced, the contact resistance between the positive-electrode lead 7 and the collector 2b of the positive electrode 2 is increased excessively. Thus, the heavy load resistance of the gel electrolyte battery 1 deteriorates.

Therefore, it can be considered that the upper limit of the amount of shift $l_1$ of the positive-electrode lead 7 from the end of the 2b is about 80% of the width of the collector 2b of the positive electrode 2. Specifically, it is preferable that $l_1$ is, for example, about 1 mm.

Figure 6:
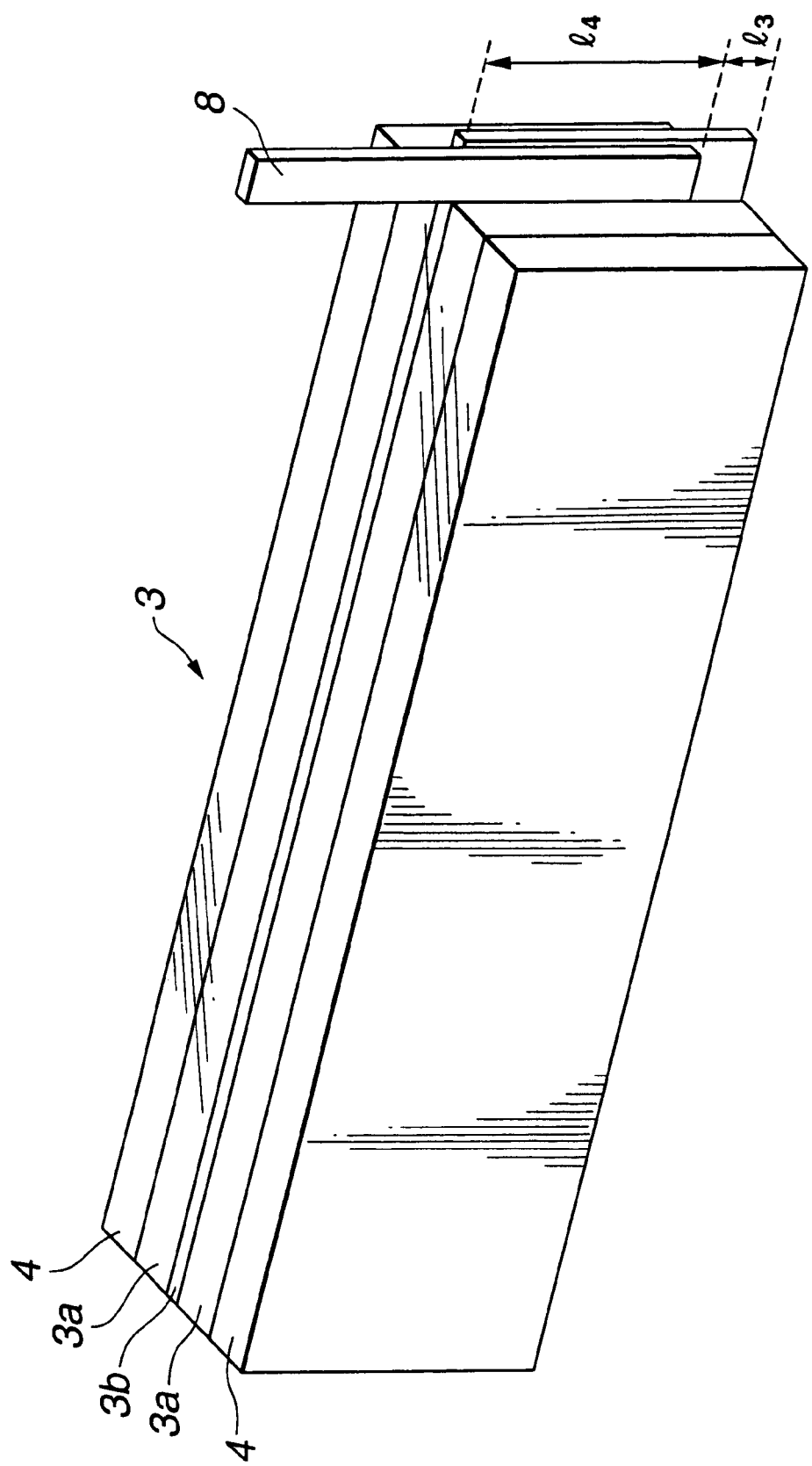
FIG. 6 is a perspective view showing an example of the structure of the negative electrode.

As shown in FIG. 6, the negative electrode 3 is structured such that a negative-electrode active material layer 3a containing negative-electrode active material is formed on each of the two sides of the collector 3b of the negative electrode 3. The collector 3b of the negative electrode 3 is constituted by metal foil, such as copper foil. Note that FIG. 6 shows a state in which a gel electrolyte layer 4 has been formed on the negative-electrode active material layer 3a.

The negative-electrode active material may be material which permits lithium to be doped/dedoped. The material permitting lithium to be doped/dedoped is exemplified by carbon black, such as pyrocarbon, cokes or acetylene black; a carbon material, such as graphite, vitreous carbon, active carbon, carbon fiber, sintered material of organic polymer, a sintered material of coffee beans, sintered material of cellulose or sintered material of bamboo; and a conductive polymer, such as lithium, a lithium alloy or polyacetylene.

The negative-electrode lead 8 is formed into substantially a rectangular shape. The negative-electrode lead 8 is welded to a lengthwise end of the collector 3b of the negative electrode 3. The negative-electrode lead 8 is welded to a portion in which the gel electrolyte layer 4 and the negative-electrode active material layer 3a are not formed such that the long side of the negative-electrode lead 8 is substantially in parallel with the widthwise direction of the collector 3b of the negative electrode 3. The negative-electrode lead 8 is constituted by, for example, nickel foil.

As shown in FIG. 6, the gel electrolyte battery 1 has a structure that either short side of the negative-electrode lead 8 is inwards shifted from the lengthwise end of the collector 3b of the negative electrode 3 by a predetermined length $l_3$.

The negative-electrode lead 8 is inwards shifted from the lengthwise end of the collector 3b of the negative electrode 3 as described above. When the wound electrode 5 is enclosed in the casing film 6, the negative-electrode lead 8 is not caught by the sealed portion of the casing film 6 as indicated with a circle A shown in FIG. 3. Therefore, defective sealing caused from catching of the negative-electrode lead 8 by the sealed portion can considerably be prevented.

It is preferable that the amount of shift $l_3$ of the negative-electrode lead 8 from the end of the collector 3b of the negative electrode 3 is 0.5 mm or larger to realize satisfactory productivity. If $l_3$ is too large, the weld length $l_4$ of the negative-electrode lead 8 is reduced excessively. It leads to a fact that the area of contact between the negative-electrode lead 8 and the collector 3b of the negative electrode 3 is reduced undesirably. If the area of contact is reduced, the contact resistance between the negative-electrode lead 8 and the collector 3b of the negative electrode 3 is raised excessively to maintain the heavy load resistance of the gel electrolyte battery 1.

Therefore, it can be considered that the upper limit of the amount of shift $l_3$ of the negative-electrode lead 8 from the end of the collector 3b of the negative electrode 3 is about 80% of the collector 3b of the negative electrode 3. Specifically, it is preferable that $l_3$ is about 1 mm.

The gel electrolyte layer 4 contains the electrolyte, matrix polymers and swelling solvent serving as a plasticizer.

The electrolyte salt may be any one of $LiPF_6$, $LiAsF_6$, $LiBF_4$, $LiClO_4$, $LiCF_3SO_3$, $Li(CF_3SO_2)_2N$ and $LiC_4F_9SO_3$ or their mixture.

When the matrix polymer has ion conductivity higher than 1 mS/cm at room temperatures, the chemical structure of the matrix polymer is not limited. The matrix polymer is exemplified by polyacrylonitrile, polyvinylidene fluoride, polytetrafluoroethylene, polyhexafluoropropylene, polyethylene oxide, polypropylene oxide, polyphosphagen, polysiloxane, polyvinyl acetate, polyvinyl alcohol, polymethyl methacryate, polyacrylic acid, polymethacrylic acid, styrene-butadiene rubber, nitrile-butadiene rubber, polystyrene or polycarbonate.

The swelling solvent may be any one of the following nonaqueous solvent: ethylene carbonate, propylene carbonate, butylene carbonate, γ-butylolactone, γ-valerolactone, diethoxyethane, tetrahydrofuran, 2-methyltetrahydrofuran, 1, 3-dioxane, methyl acetate, methyl propionate, dimethylcarbonate, diethyl carbonate or ethylmethyl carbonate or their mixture.

A manufacturing method of the gel electrolyte battery 1 structured as described above will now be described.

The positive electrode 2 is manufactured as follows: a positive-electrode mix containing a positive-electrode active material and a binder is uniformly applied to the surface of metal foil, such as aluminum foil, which will be formed into collector 2b of the positive electrode 2. Then, the metal foil is dried. Thus, the positive-electrode active material layer 2a is formed so that a positive-electrode sheet is manufactured. The binder of the positive-electrode mix may be a known binder. A known additive and the like may be added to the positive-electrode mix.

Then, the gel electrolyte layer 4 is formed on the positive-electrode active material layer 2a of the positive-electrode sheet. To form the gel electrolyte layer 4, electrolyte salt is dissolved in nonaqueous solvent to prepare nonaqueous electrolytic solution. Then, matrix polymers are added to the nonaqueous electrolytic solution, and then the solution is sufficiently stirred to dissolve the matrix polymers. Thus, sol electrolytic solution is prepared.

Then, the electrolytic solution in a predetermined quantity is applied to the surface of the positive-electrode active material layer 2a. Then, a process for lowering the temperature to the room temperature is performed to gel the matrix polymers. Hence it follows that the gel electrolyte layer 4 is formed on the positive-electrode active material layer 2a.

Then, the positive-electrode sheet having the gel electrolyte layer 4 formed thereon is cut into an elongated shape.

The gel electrolyte layer 4 and the positive-electrode active material layer 2a in the portion to which the positive-electrode lead 7 will be welded are removed by cutting. Then, a positive-electrode lead 7 made of, for example, aluminum and formed into substantially a rectangular shape is welded to the cut portion. The welding process is performed such that either of the short sides of the positive-electrode lead 7 is inwards shifted by $l_1$ from the lengthwise end of the cut positive-electrode sheet. Thus, the elongated positive electrode 2 having the gel electrolyte layer 4 formed thereon can be obtained. The positive-electrode lead 7 may be joined to the collector 2b of the positive electrode 2 by a known welding method, such as supersonic welding, spot welding or laser welding.

The negative electrode 3 is manufactured as follows: a negative-electrode mix containing a negative-electrode active material and a binder is uniformly applied to the surface of metal foil, such as copper foil, which will be formed into the collector 3b of the negative electrode 3. Then, the metal foil is dried. Thus, the negative-electrode active material layer 3a is formed so that a negative-electrode sheet is manufactured. The binder of the negative-electrode mix may be a known binder. A known additive and the like may be added to the negative-electrode mix.

Then, the gel electrolyte layer 4 is formed on the negative-electrode active material layer 3b of the negative-electrode sheet. To form the gel electrolyte layer 4, the electrolytic solution prepared similarly to the foregoing process is applied to the surface of the negative-electrode active material layer in a predetermined quantity. Then, a cooling process for lowering the temperature to the room temperature is performed to gel the matrix polymers. Thus, the gel electrolyte layer 4 is formed on the negative-electrode active material layer 3a.

Then, the negative-electrode sheet having the gel electrolyte layer 4 formed thereon is cut into an elongated shape. The gel electrolyte layer 4 and the negative-electrode active material layer 3a in the portion to which the positive-electrode lead 7 will be welded are removed by cutting. Then, a negative-electrode lead 8 made of, for example, nickel and formed into substantially a rectangular shape is welded to the cut portion. The welding process is performed such that either of the short sides of the negative-electrode lead 8 is inwards shifted by $l_3$ from the lengthwise end of the cut negative-electrode sheet. Thus, the elongated negative electrode 3 having the gel electrolyte layer 4 formed thereon can be obtained. The negative-electrode lead 8 may be joined to the collector 3b of the negative electrode 3 by a known welding method, such as supersonic welding, spot welding or laser welding.

Then, the elongated positive electrode 2 and negative electrode 3 manufactured as described above are bonded and pressed such that the gel electrolyte layers 4 are disposed opposite to each other. Thus, a laminated electrode is obtained. Then, the laminated electrode is wound in the lengthwise direction so that the wound electrode 5 is obtained.

Finally, the wound electrode 5 is sandwiched by the casing films 6 made of insulating material, and then resin films are applied to the portions in which the positive-electrode lead 7, the negative-electrode lead 8 and the casing film 6 overlap. Then, the peripheries of the casing films 6 are sealed to sandwich the positive-electrode lead 7 and the negative-electrode lead 8 in the sealed portion of the casing film 6. Moreover, the wound electrode 5 is hermetically enclosed between the casing films 6. As a result, the gel electrolyte battery 1 is manufactured.

The gel electrolyte battery 1 which is manufactured as described above is free of a problem that the positive-electrode lead 7 or the negative-electrode lead 8 is caught by the sealed portion when the wound electrode 5 is enclosed in the casing films 6. Therefore, defective sealing can considerably be prevented. Since the gel electrolyte battery 1 is free from introduction of moisture into the casing films 6 through a defective sealing portion or a broken portion of the casing film 6, deterioration in the performance of the battery caused from moisture introduced into the battery can be prevented.

The shape of the gel electrolyte battery 1 according to this embodiment may have a cylindrical shape or a rectangular shape. Moreover, the size and the thickness are not limited. For example, a thin structure or a large structure may be employed.

The foregoing embodiment has been described about the gel electrolyte battery 1 containing the swelling solvent and incorporating the gel solid electrolyte as the solid electrolyte battery. The present invention is not limited to the foregoing description. The present invention may be applied to a solid electrolyte battery which incorporates a solid electrolyte which does not contain the swelling solvent. The present invention may be applied to a primary battery or a secondary battery.

EXAMPLES

Gel-electrolyte battery was manufactured to evaluate its characteristics so as to confirm the effects of the present invention.

Example 1

The positive electrode was manufactured as follows: initially lithium carbonate in a quantity of 0.5 mole and cobalt carbonate in a quantity of 1 mole were mixed with each other. Then, the mixture was baked at 900° C. for 5 hours in the air. Thus, $LiCoO_2$ which was a positive-electrode active material was prepared. Then, 91 parts by weight of $LiCoO_2$, 6 parts by weight of graphite serving as a conductive agent and 3 parts by weight of polyvinylidene fluoride serving as the binder were mixed with one another, and then dispersed in N-methyl pyrolidone. Thus, slurry was prepared. Then, the slurry was uniformly applied to the two sides of a positive-electrode collector having a thickness of 20 μm and constituted by aluminum foil. Then, the two sides were dried so that a positive-electrode active material layer was formed. The layer was dried, and then the positive-electrode collector was pressed by a roll press so that a positive electrode sheet was manufactured. The density of the positive-electrode active material was 3.6 g/cm$^3$.

Then, a gel electrolyte layer was formed on the positive electrode. To form the gel electrolyte layer, 42.5 parts by weight of ethylene carbonate, 42.5 parts by weight of propylene carbonate and 15 parts by weight of $LiPF_6$ were mixed with one another so that a plasticizer was prepared. Then, the plasticizer in a quantity of 30 parts by weight, 10 parts by weight of material serving as a matrix polymer and obtained by copolymerizing vinylidene fluoride and hexafluoropropylene at a weight ratio of 97:3 and 60 parts by weight of tetrahydrofuran were mixed and dissolved. Thus, electrolytic solution in a sol form was obtained.

Then, the electrolytic solution was uniformly applied to the two sides of the positive electrode sheet, and then the sheet was dried to remove tetrahydrofuran. Thus, a gel electrolyte layer having a thickness of 100 μm was formed on the positive-electrode active material layer.

The positive electrode sheet having the gel electrolyte layer formed thereon was cut so that a member formed into a shape that a 50 mm×5 mm portion to which a lead was welded was provided for a 50 mm×260 mm portion was obtained. The gel electrolyte layer and the positive-electrode active material layer in the portion to which the lead was welded were removed by cutting. Then, the positive-electrode lead made of aluminum and formed into substantially a rectangular shape was welded such that either side of the positive-electrode lead was positioned inwards by 1 mm from the lengthwise end of the cut positive-electrode sheet. Thus, an elongated positive electrode having the gel electrolyte layer having a thickness of 100 µm formed on each of the two sides thereof was obtained. Note that weld length $l_2$ of the positive-electrode lead was 49 mm.

Then, the negative electrode was manufactured as follows.

Initially, 90 parts by weight of graphite and 10 parts by weight of polyvinylidene fluoride were mixed with each other. Then, the mixture was dispersed in N-methyl pyrolidone so as to be slurried. Then, the slurry was uniformly applied to the two sides of a negative-electrode collector having a thickness of 10 µm and constituted by copper foil. Then, the negative-electrode collector was dried so that a negative-electrode active material layer was formed. Then, the negative-electrode collector was dried, and then pressed by a roll press. Thus, a negative electrode sheet was manufactured. The density of the negative-electrode active material was 1.6 g/cm³.

Then, a gel electrolyte layer was formed on the negative electrode. To form the gel electrolyte layer, electrolytic solution prepared by a method similar to the foregoing process was uniformly applied to the two sides of the negative electrode sheet, and then the negative electrode sheet was dried to remove tetrahydrofuran. Thus, the gel electrolyte layer having a thickness of 100 µm was formed on the negative-electrode active material layer.

The negative electrode sheet having the gel electrolyte layer formed thereon was cut so that a member formed into a shape that a 52 mm×5 mm portion to which a lead was welded was provided for a 52 mm×300 mm portion was obtained. The gel electrolyte layer and the negative-electrode active material layer in the portion to which the lead was welded were removed by cutting. Then, a negative-electrode lead made of nickel and formed into substantially a rectangular shape was welded. The welding operation was performed such that either of short sides of the negative-electrode lead was positioned inwards by 1 mm from either lengthwise end of the cu negative-electrode sheet. Thus, an elongated negative electrode having the gel electrolyte layer having a thickness of 100 µm formed on each of the two sides thereof was obtained. Note that the weld length $l_4$ of the negative-electrode lead of the negative-electrode lead was 51 mm.

Then, the elongated positive electrode having the two sides on which the gel electrolyte layers were formed and the elongated negative electrode having the two sides on which the gel electrolyte layers were formed were laminated so that a laminate was constituted. Then, the laminate was wound in its lengthwise direction so that a wound electrode was obtained.

Then, the wound electrode was sandwiched by a casing film constituted by laminating a nylon layer having a thickness of 25 µm, an aluminum layer having a thickness of 40 µm and a polypropylene layer having a thickness of 30 µm when the laminate was viewed from outside. Note that a polyethylene film was applied to the portion in which the positive-electrode lead, the negative-electrode lead and the casing film overlap. Then, the periphery of the casing films was welded with heat so as to be sealed. Thus, the positive-electrode lead and the negative-electrode lead were sandwiched in the sealed portion between the casing films. Moreover, the wound electrode was hermetically enclosed in the casing films. Thus, the gel electrolyte battery was manufactured.

Example 2

A similar process to that according to Example 1 was performed so that a gel electrolyte battery was manufactured except for the following process: the positive-electrode lead was welded such that either short side of the positive-electrode lead was positioned inwards by 5 mm from the lengthwise end of the positive-electrode sheet. Moreover, the negative-electrode lead was welded such that either short side of the negative-electrode lead was positioned inwards by 5 mm from the lengthwise end of the negative-electrode sheet. Note that the weld length $l_2$ of the positive-electrode lead was 45 mm and the weld length $l_4$ of the negative-electrode lead was 47 mm.

Example 3

A similar process to that according to Example 1 was performed so that a gel electrolyte battery was manufactured except for the following process: the positive-electrode lead was welded such that either short side of the positive-electrode lead was positioned inwards by 10 mm from the lengthwise end of the positive-electrode sheet. Moreover, the negative-electrode lead was welded such that either short side of the negative-electrode lead was positioned inwards by 10 mm from the lengthwise end of the negative-electrode sheet. Note that the weld length $l_2$ of the positive-electrode lead was 40 mm and the weld length $l_4$ of the negative-electrode lead was 42 mm.

Example 4

A similar process to that according to Example 1 was performed so that a gel electrolyte battery was manufactured except for the following process: the positive-electrode lead was welded such that either short side of the positive-electrode lead was positioned inwards by 20 mm from the lengthwise end of the positive-electrode sheet. Moreover, the negative-electrode lead was welded such that either short side of the negative-electrode lead was positioned inwards by 20 mm from the lengthwise end of the negative-electrode sheet. Note that the weld length $l_2$ of the positive-electrode lead was 30 mm and the weld length $l_4$ of the negative-electrode lead was 32 mm.

Example 5

A similar process to that according to Example 1 was performed so that a gel electrolyte battery was manufactured except for the following process: the positive-electrode lead was welded such that either short side of the positive-electrode lead was positioned inwards by 30 mm from the lengthwise end of the positive-electrode sheet. Moreover, the negative-electrode lead was welded such that either short side of the negative-electrode lead was positioned inwards by 30 mm from the lengthwise end of the negative-electrode sheet. Note that the weld length $l_2$ of the positive-electrode lead was 20 mm and the weld length $l_4$ of the negative-electrode lead was 22 mm.

Comparative Example 1

A similar process to that according to Example 1 was performed so that a gel electrolyte battery was manufactured except for the following process: the positive-electrode lead was welded such that either short side of the positive-electrode lead was positioned outwards by 1 mm from the lengthwise end of the positive-electrode sheet. Moreover, the negative-electrode lead was welded such that either short side of the negative-electrode lead was positioned outwards by 1 mm from the lengthwise end of the negative-electrode sheet. Note that the weld length $l_2$ of the positive-electrode lead was 50 mm and the weld length $l_4$ of the negative-electrode lead was 52 mm.

Comparative Example 2

A similar process to that according to Example 1 was performed so that a gel electrolyte battery was manufactured except for the following process: the positive-electrode lead was welded such that either short side of the positive-electrode lead overlapped a lengthwise end of the positive-electrode sheet. Moreover, the negative-electrode sheet was welded such that either short side of the negative-electrode lead overlapped the lengthwise end of the negative-electrode sheet. Note that the weld length $l_2$ of the positive-electrode lead was 50 mm and the weld length $l_4$ of the negative-electrode lead was 52 mm.

The ratio of occurrence of defective sealing and the discharge capacity of each of the gel electrolyte batteries according to Examples 1 to 5 and Comparative Examples 1 and 2 were examined. Fifty batteries of each examples and comparative examples were measured.

The charge and discharge tests were performed by using a potentio-galvanostat such that an operation of charging a constant current of 90 mA was started. When the voltage of a closed circuit was raised to 4.2 V, the charging method was switched to charging of constant voltage. The charging operation was completed after a lapse of 8 hours from start of the charging operation. Then, discharge of a constant current of 90 mA was performed. When the voltage of the closed circuit was raised to 3.0 V, the discharging operation was completed. Each of the batteries according to Examples 1 to 5 and Comparative Examples 1 and 2 free of defective sealing had a discharge capacity of 450 mAh.

Then, charging was again performed under the same conditions as the conditions under which the foregoing charge and discharge tests were performed. Then, discharge of a constant current of 1350 mA was performed. When the voltage of the closed circuit was raised to 3.0 V, discharging was completed. Then, the discharge capacity of each battery was measured such that discharge of 1350 mA was performed.

Table 1 showed measured occurrence ratio of defective sealing and discharge capacity of each of the batteries according to Examples 1 to 5 and Comparative Examples 1 and 2. Note that the discharge capacities shown in Table 1 were average values of fifty batteries each according to Examples 1 to 5 and average values of the batteries according to Comparative Examples 1 and 2 of a type free of defective sealing.

TABLE 1

|  | Occurrence Ratio of Defective sealing (%) | 1350 mA Discharge Capacity (mAh) |
| --- | --- | --- |
| Example 1 | 0 | 382 |
| Example 2 | 0 | 382 |
| Example 3 | 0 | 380 |
| Example 4 | 0 | 375 |
| Example 5 | 0 | 366 |
| Comparative Example 1 | 22 | 381 |
| Comparative Example 2 | 4 | 381 |

As can be understood from Table 1, the batteries according to Examples 1 to 5 each having the structure that either short side of the electrode lead was shifted inwards from the lengthwise end of the electrode were free of any defective sealing. On the other hand, the battery according to Comparative Example 1 having the structure that either side of the electrode lead was outwards shifted from the lengthwise end of the electrode and the battery according to Comparative Example 2 having the structure that the either side of the electrode lead overlapped the widthwise-directional end of the electrode encountered defective sealing.

Therefore, a fact was detected that the inward shift of either short side of the electrode leading end from the lengthwise end of the electrode prevented catching of the electrode led by the sealed portion when the wound electrode was hermetically enclosed between the casing films. Thus, defective sealing was significantly prevented.

Moreover, the inward shift of either short side of the electrode leading end from the lengthwise end of the electrode maintained a satisfactory heavy-load resistance as compared with the structure that the electrode lead was welded to the overall width of the electrode. If the amount of shift of the electrode lead is too large, the area of contact of the electrode lead is reduced. Thus, the resistance is raised and, therefore, the heavy-load resistance deteriorates. Therefore, it can be considered that the upper limit of the amount of shift of the electrode lead from the lengthwise end of the electrode is about 80% of the width of the electrode.

The present invention, which is structured such that the end of the electrode lead is inwards shifted from the lengthwise end of the electrode, is able to overcome a problem that the electrode lead is caught by the sealed portion of the casing member when the wound electrode is hermetically enclosed in the casing member.

As a result, the present invention enables the manufacturing yield to be improved because defective sealing of the casing member can be prevented without any deterioration in the heavy load resistance of the solid electrolyte battery. Since the present invention is able to prevent the problem that the electrode lead is caught by the casing member, the casing member can be in furthermore hermetically contact with the wound electrode. Therefore, the size of the battery can furthermore be reduced. As a result, a solid electrolyte battery exhibiting a high volume energy density can be obtained.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A solid-electrolyte battery comprising:

an elongated positive electrode having lengthwise and widthwise directions and a lengthwise end;

a positive-electrode lead formed into substantially a rectangular shape having a long side and a short side connected to said positive electrode such that the long side of said positive-electrode lead is substantially in parallel with the widthwise direction of said positive electrode;

an elongated negative electrode having lengthwise and widthwise directions disposed opposite to said positive electrode;

a negative-electrode lead formed into substantially a rectangular shape having a long side and a short side connected to said negative electrode such that the long side of said negative-electrode lead is substantially in parallel with the widthwise direction of said negative electrode; and a solid electrolyte layer formed on at least either surface of said positive electrode and said negative electrode, wherein said positive electrode and said negative electrode are laminated such that the surfaces in each of which said solid electrolyte layer is formed are disposed opposite to each other and wound in the lengthwise direction so as to be accommodated in a case of said solid-electrolyte battery, and the short side of at least either of said positive-electrode lead or said negative-electrode lead which is connected to said positive electrode or said negative electrode such that said short side is disposed opposite to the lengthwise end of said positive electrode or said negative electrode is shifted inwards as compared with the lengthwise end of said positive electrode or said negative electrode.

2. A solid-electrolyte battery according to claim 1, wherein said solid electrolyte layer contains swelling solvent and in the form of gel.

3. A solid-electrolyte battery according to claim 1, wherein said positive electrode contains positive-electrode active material formed on the two sides of a collector of said positive electrode.

4. A solid-electrolyte battery according to claim 3, wherein said positive-electrode active material is any one of lithium cobalt acid, lithium nickel acid, lithium manganese acid, material obtained by substituting other transition metal for a portion of each of the composite oxides, manganese dioxide, vanadium pentoxide or iron sulfide.

5. A solid-electrolyte battery according to claim 1, wherein said negative electrode contains negative-electrode active material formed on the two sides of a collector of said negative electrode.

6. A solid-electrolyte battery according to claim 4, wherein said negative-electrode active material is material which is capable of doping/dedoping lithium.

7. A solid-electrolyte battery according to claim 6, wherein said material capable of doping/dedoping lithium is selected from a group consisting of carbon material, lithium, a lithium alloy and a conductive polymer.

8. A solid-electrolyte battery comprising:

a wound electrode constituted by, in a lengthwise direction, spirally winding first and second elongated electrodes which are laminated such that a solid electrolyte layer is sandwiched between said first and second elongated electrodes;

electrode leads disposed to overlap said first and second elongated electrodes in a widthwise direction of said first and second elongated electrodes and positioned on the outer surface of said wound electrode; and a casing film accommodating said wound electrode, and structured such that an opening formed at an end of said casing film is sealed, wherein a lengthwise end of said lead is shifted from a lengthwise end of said elongated electrode.

9. A solid-electrolyte battery according to claim 8, wherein said solid electrolyte layer contains swelling solvent and in the form of gel.

10. A solid-electrolyte battery according to claim 8, wherein said positive electrode contains positive-electrode active material formed on the two sides of a collector of said positive electrode.

11. A solid-electrolyte battery according to claim 10, wherein said positive-electrode active material is any one of lithium cobalt acid, lithium nickel acid, lithium manganese acid, material obtained by substituting other transition metal for a portion of each of the composite oxides, manganese dioxide, vanadium pentoxide or iron sulfide.

12. A solid-electrolyte battery according to claim 8, wherein said negative electrode contains negative-electrode active material formed on the two sides of a collector of said negative electrode.

13. A solid-electrolyte battery according to claim 11, wherein said negative-electrode active material is material which is capable of doping/dedoping lithium.

14. A solid-electrolyte battery according to claim 13, wherein said material capable of doping/dedoping lithium is selected from a group consisting of carbon material, lithium, a lithium alloy and a conductive polymer.

* * * * *